(12) United States Patent
Chen-Ho et al.

(10) Patent No.: US 11,572,492 B2
(45) Date of Patent: Feb. 7, 2023

(54) MICROSTRUCTURED RELEASE LINERS FOR SELECTIVE TRANSFER OF INK TO FILM

(71) Applicant: 3M INNOVATIVE PROPERTIES COMPANY, St. Paul, MN (US)

(72) Inventors: Kui Chen-Ho, Woodbury, MN (US); Patrick J. Yeshe, Woodbury, MN (US); Matthew S. Stay, Bloomington, MN (US); Matthew R. D. Smith, Woodbury, MN (US); Anish Kurian, Woodbury, MN (US); Ross E. Behling, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/734,349

(22) PCT Filed: Jun. 6, 2019

(86) PCT No.: PCT/IB2019/054732
§ 371 (c)(1),
(2) Date: Dec. 2, 2020

(87) PCT Pub. No.: WO2019/234684
PCT Pub. Date: Dec. 12, 2019

(65) Prior Publication Data
US 2021/0222033 A1 Jul. 22, 2021

Related U.S. Application Data

(60) Provisional application No. 62/681,827, filed on Jun. 7, 2018.

(51) Int. Cl.
*C09J 7/40* (2018.01)
*C09J 7/38* (2018.01)

(52) U.S. Cl.
CPC ............ *C09J 7/403* (2018.01); *C09J 7/385* (2018.01); *C09J 2301/40* (2020.08);
(Continued)

(58) Field of Classification Search
CPC ........ C09J 7/403; C09J 7/385; C09J 2301/40; C09J 2301/408; C09J 2301/41; Y10T 428/1476
See application file for complete search history.

(56) References Cited

U.S. PATENT DOCUMENTS

| 4,554,324 A | 11/1985 | Husman |
| 4,737,559 A | 4/1988 | Kellen |

(Continued)

FOREIGN PATENT DOCUMENTS

| WO | WO 1995-11945 | 5/1995 |
| WO | WO 1997-33946 | 9/1997 |

(Continued)

OTHER PUBLICATIONS

Smith, Modern Optical Engineering, 104-105 (1966).
International Search Report for PCT International Application No. PCT/IB2019/054732, dated Oct. 14, 2019, 5 pages.

*Primary Examiner* — Patricia L. Nordmeyer
(74) *Attorney, Agent, or Firm* — Jeffrey M. Olofson

(57) ABSTRACT

Modified adhesive layers are prepared by contacting an adhesive layer to a modified microstructured release liner. The modified release liner has a release layer surface with a set of microstructured depressions and a discontinuous pattern of ink material located on the surface of the release layer. A portion of the discontinuous pattern of ink material overlaps with and is located within some of the depressions. The ink material comprises a non-adhesive but adhesively transferrable material, or an adhesive material. Upon
(Continued)

removal of the adhesive from the release liner, the ink material transfers to the adhesive surface.

11 Claims, 2 Drawing Sheets

(52) U.S. Cl.
CPC ...... *C09J 2301/408* (2020.08); *C09J 2301/41* (2020.08); *Y10T 428/1476* (2015.01)

(56) References Cited

U.S. PATENT DOCUMENTS

| | | |
|---|---|---|
| 5,122,902 A | 6/1992 | Benson |
| 5,141,790 A | 8/1992 | Calhoun |
| 5,296,277 A | 3/1994 | Wilson |
| 5,362,516 A | 11/1994 | Wilson |
| 5,506,279 A | 4/1996 | Babu |
| 5,676,787 A | 10/1997 | Rusincovitch |
| 6,083,856 A | 7/2000 | Joseph |
| 6,197,397 B1 | 3/2001 | Sher |
| 6,315,651 B1 | 11/2001 | Mazurek |
| 7,879,419 B2 | 2/2011 | Stocq |
| 9,240,131 B2 * | 1/2016 | Onderisin ............. B31D 1/027 |
| 2001/0031353 A1 | 10/2001 | Hannington |
| 2008/0299346 A1 | 12/2008 | Onderisin |
| 2010/0196664 A1 | 8/2010 | Kuiper |
| 2011/0132531 A1 | 6/2011 | Hannington |
| 2013/0004749 A1 | 1/2013 | Hao |
| 2014/0363564 A1 | 12/2014 | Rule |

FOREIGN PATENT DOCUMENTS

| | | |
|---|---|---|
| WO | WO 1999-42536 | 8/1999 |
| WO | WO 2000-69985 | 11/2000 |
| WO | WO 2014-179660 | 11/2014 |
| WO | WO 2018-106489 | 6/2018 |
| WO | WO 2019-123181 | 6/2019 |

* cited by examiner

MICROSTRUCTURED RELEASE LINERS FOR SELECTIVE TRANSFER OF INK TO FILM

FIELD OF THE DISCLOSURE

The present disclosure relates to microstructured release liners and methods of selectively transferring inks from the release liners to a film substrate.

BACKGROUND

Adhesives have been used for a variety of marking, holding, protecting, sealing and masking purposes. Adhesive tapes generally comprise a backing, or substrate, and an adhesive. One type of adhesive, a pressure sensitive adhesive (PSA) is particularly preferred for many applications.

PSAs are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs are polymers designed and formulated to exhibit the requisite viscoelastic properties resulting in a desired balance of tack, peel adhesion, and shear strength. The most commonly used polymers for preparation of PSAs are natural rubber, synthetic rubbers (e.g., styrene/butadiene copolymers (SBR) and styrene/isoprene/styrene (SIS) block copolymers), and various (meth)acrylate (e.g., acrylate and methacrylate) copolymers. With the exception of several (meth)acrylates, which are inherently tacky, these polymers are typically blended with appropriate tackifying resins to render them pressure sensitive.

SUMMARY

This disclosure relates to release liners, adhesive articles, modified adhesive layers, and methods of preparing adhesive articles. Disclosed herein are release liners comprising a release layer with a first major surface and second major surface, where the second major surface of the release layer comprises a first set of microstructured features comprising a plurality of depressions into the second major surface of the release layer, and a discontinuous pattern of ink material located on the second major surface of the release layer. At least a portion of the discontinuous pattern of ink material overlaps with and is located within some of the depressions. The ink material comprises a non-adhesive but adhesively transferrable material, or an adhesive material.

Also disclosed are adhesive articles. In some embodiments the adhesive article comprises a release liner, where the release liner is described above, and an adhesive layer with a first major surface and a second major surface, where the first major surface of the adhesive layer is in contact with the second major surface of the release layer. The release liner comprises a release layer with a first major surface and second major surface, where the second major surface of the release layer comprises a first set of microstructured features comprising a plurality of depressions into the second major surface of the release layer, and a discontinuous pattern of ink material located on the second major surface of the release layer. At least a portion of the discontinuous pattern of ink material overlaps with and is located within some of the depressions. The ink material comprises a non-adhesive but adhesively transferrable material, or an adhesive material.

Also disclosed are modified adhesive layers comprising an adhesive layer with a first major surface and a second major surface, where the first major surface comprises a modified adhesive surface. The modified adhesive surface comprises a first set of microstructured features comprising a plurality of protrusions from the first major surface of the adhesive layer, where some of the protrusions comprise the adhesive material of the adhesive layer, and other protrusions comprise the adhesive layer material and ink material, where the ink material comprises a non-adhesive material, or an adhesive material that is different from the adhesive material of the adhesive layer.

Methods for preparing adhesive articles are also disclosed. In some embodiments, the method comprises providing a modified microstructured release liner, where the modified microstructured release liner is described above, providing an adhesive layer or an adhesive layer precursor material, contacting the adhesive layer or the adhesive layer precursor material to the second major surface of the release layer to form an adhesive layer with a first major surface and a second major surface, where the first major surface of the formed adhesive layer is in contact with the second major surface of the release layer, and removing the adhesive layer from the release layer to generate a modified adhesive layer. The modified microstructured release liner comprises a release layer with a first major surface and a second major surface, comprising a first set of microstructured features comprising a plurality of depressions into the second major surface of the release layer, and a discontinuous pattern of ink material located on the second major surface of the release layer, where at least a portion of the discontinuous pattern of ink material overlaps with and is located within some of the depressions. The ink material comprises a non-adhesive but adhesively transferrable material, or an adhesive material;

BRIEF DESCRIPTION OF THE DRAWINGS

The disclosure may be more completely understood in consideration of the following detailed description of various embodiments of the disclosure in connection with the accompanying figures, in which.

Figure 1:
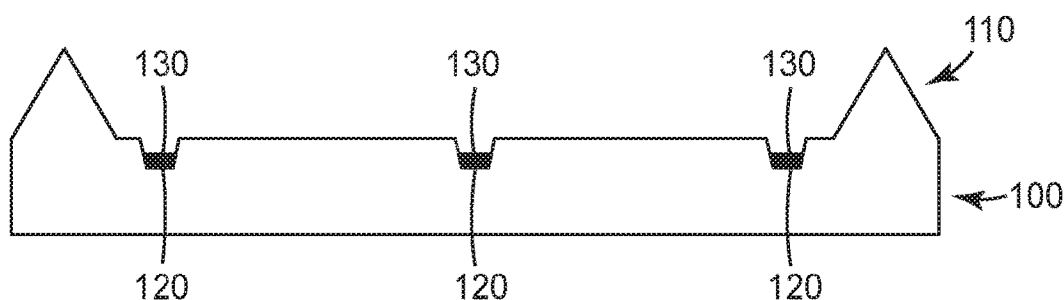
FIG. 1 is a cross sectional view of a microstructured release liner that can be modified according to the methods of the present disclosure.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

The use of adhesive articles with structured surfaces, especially microstructured surfaces is increasing. These structured surfaces may be temporary features, meaning that the structures are designed to eventually disappear, or permanent features, meaning that the structures are not designed to disappear. Permanently structured adhesive surfaces are generally formed to control the adhesive properties of the adhesive layer, such as making the adhesive layer repositionable (as described, for example, in U.S. Pat. No. 6,315,651 (Mazurek et al.)) or to control the physical properties of the adhesive layer, such as for example to build in pillows of air to the adhesive layer to make the adhesive layer cushioning (as described, for example, in PCT Publication No. 97/33946 (Hata)). It is more typical, however, for adhesive layers to have structured surfaces that are temporarily structured.

There are numerous advantages to use adhesive articles with temporarily structured surfaces. Sometimes these adhesive articles are described as "laminating adhesive articles", since upon lamination the structures at least partially disappear. One such advantage of temporarily structured surfaces is air egress from the bond line. When an adhesive bond is formed, the adhesive surface is contacted to an adherend surface. When this contact is made, air can become trapped between the adhesive layer and the adherend surface, causing bubbles or other defects to form in the bond line, the line along which the two surfaces are joined together. This is particularly true when dealing with adherends that are rigid and semi-rigid substrates, but is also true when dealing with flexible substrates. This is particularly true with articles that are hand-laminated, as the lamination is subject to variability based upon operator experience and skill. These defects not only affect the adhesion of the adhesive layer to the adherend surface, but also affect the aesthetic appearance of the bond line especially in the case of graphic articles. Currently used methods to prevent defects in such laminations include techniques such as coating the adhesive layer with water or a water-detergent solution to prevent bubble formation during lamination. These techniques generally require removal of the water. A water-less technique involves the use of a structured adhesive surface. Generally, these structures are microstructures. During lamination, the microstructural features flatten out, thereby wetting the adherend surface, and forming a bond to the adherend surface. In the course of lamination, air bleeds out through the microstructural features to minimize or prevent the formation of bonding defects. The air egress feature is particularly important when dealing with lamination to adherends that are rigid substrates, especially rigid-to-rigid lamination or where the object to be laminated is relatively large. Besides the air egress structures that can be imparted to the adhesive layer by the microstructured release liners, other structural features can be imparted to give additional features such as positionability and repositionability, as is discussed in further detail below.

A variety of techniques for creating a temporarily structured adhesive surface have been developed. In some instances the adhesive layer surface is contacted to the surface of a structured tool. This process of pressing a structured tool to an adhesive surface is typically referred to as embossing in the adhesive art. The inverse of the pattern of the tool surface is formed in the adhesive surface. Upon removal of the structured tool a structured adhesive surface is generated. When this technique is used, the adhesive layer is generally contacted to an adherend soon after removal of the structured tool, such as in a continuous in-line process. In a closely related technique, a structured release liner is contacted to the adhesive surface. The structured release liner is similar to a structured tool in that it also has a structured pattern present on its surface. However, unlike a structured tool, the structured release liner generally is designed to remain in contact with the adhesive layer to form a laminate construction. The structured release liner remains in contact with the adhesive layer until it is desired to laminate the adhesive layer to an adherend, at which time the liner is removed to reveal the structured surface. An advantage of this technique is that because the liner remains adhered to the adhesive surface, it protects the structured surface until the adhesive layer is to be used.

Another technique involves coating an adhesive precursor composition to a structured tool or release liner. This adhesive precursor composition may be an adhesive solution, dispersion or a flowable 100% solids composition or it may contain reactive components that form an adhesive upon curing. Curing in this context merely refers to polymerization and may or may not involve crosslinking. Upon coating of the adhesive precursor composition to the structured tool or release liner, the composition is dried, cooled or cured to form an adhesive layer in contact with the structured tool or release liner. Upon removal of the structured tool or release liner, a structured adhesive surface is exposed as described above.

Typically structured release liners are prepared by embossing. This means that the release liner has an embossable surface which is contacted to a structured tool with the application of pressure and/or heat to form an embossed surface. This embossed surface is a structured surface. The structure on the embossed surface is the inverse of the structure on the tool surface, that is to say a protrusion on the tool surface will form a depression on the embossed surface, and a depression on the tool surface will form a protrusion on the embossed surface.

Besides the formation of structures within the adhesive surface, techniques have also been developed in which transferrable materials such as particles or clumps of particles are placed within structures on the structured release liner. Upon contact with the adhesive layer, these particles transfer to the adhesive layer to provide non-adhesive protrusions on the adhesive surface. These protrusions prevent the immediate contact of the adhesive surface with a substrate surface, giving the adhesive layer positionability as well as repositionability. Once the adhesive layer is positioned in the proper location, application of pressure to the adhesive layer, such as with a roller or squeegee, forces the particles or clumps of particles into the bulk of the adhesive layer and an adhesive bond between the adhesive layer and the substrate surface forms. Such methodologies are particularly suitable with large format articles such as large graphic articles where positionability and repositionability are necessary to permit alignment of the adhesive article with large surface area of the substrate.

As used herein, the term "positionability" when used to describe a pressure sensitive adhesive means that the pressure sensitive adhesive surface has sufficiently low initial tack as to allow the pressure sensitive adhesive to be slid across the surface of a substrate to which it is to be adhered without sticking or grabbing.

As used herein, the term "repositionability" is used synonymously with the term "temporary removability", and when used to describe a pressure sensitive adhesive means that the pressure sensitive adhesive has relatively low initial adhesion (permitting temporary removability form and repositionability on a substrate after application), with a building of adhesion over time (to form a sufficiently strong bond), but remains removable, that is to say the adhesion does not build beyond the point where it is cleanly removable from the substrate.

In addition to the features of positionability and repositionability, it may be desirable to add additional features to the adhesive layer. Among these added features are detectable informational features that do not substantially alter the adhesive properties of the adhesive layer. There are a number of reasons one would like to have detectable informational features located on the adhesive layer, such as for security purposes, lot tracking purposes, and anti-counterfeiting purposes. For example, if information such as lot numbers, supplier source, and the like could be located on the adhesive layer without altering the adhesive performance of the adhesive layer, a user would know that the article is an authentic one, and if problems arise with the article, identifying information such as a lot number are present. While it is routine to include such information on the packaging and even on the release liner of adhesive articles, however, once the article is removed from the packaging and the release liner is removed, these items are typically discarded and the adhesive article itself does not contain any of this desirable identifying information.

A wide variety of detectable informational features can be used which can utilize a wide variety of detection methods. In many embodiments, the detectable information is visible information, meaning that the detectable information is visible to the unaided human eye. Visible information is typically colored so as to contrast with the adhesive layer on which it is located. Other forms of detectable information could also be used, such as information that is detectable upon exposure to wavelengths of light other than visible light, such as infrared light, ultraviolet light, and the like. In these detectable information systems, the information is typically not visible until light of the appropriate wavelength is impinged upon the detectable information. An example of such a system is one that utilizes fluorescent materials, meaning that the materials absorb light of one wavelength (such as UV light) and re-emits light of a different wavelength (such as visible light). In such a system, no information is visible until the information is exposed to UV light, whereupon the information would become visible. Other detectable information systems that are not light dependent can also be envisioned, such as magnetic information, where dots of magnetic material can be aligned magnetically to form information, thermochromic information, where dots of thermochromic material can be heated to show information, and the like. Typically, the detectable information system is visible light readable system. The visible light readable information is generally deposited on the adhesive layer as an ink material.

In this disclosure, release liners, adhesive articles, and methods are described for preparing adhesive layers which contain identifying information. The identifying information is printed onto the release liner as a discontinuous ink pattern, and this discontinuous ink pattern is transferred from the release liner to an adhesive layer. The release liners are microstructured release liners, meaning the surface of the release liner contains a set of microstructured features. In this way the adhesive layer, when removed from the release liner, contains not only the physical structures imparted by the microstructured features of the release liner, but also the discontinuous ink pattern of identifying information.

In addition to providing identifying information, the discontinuous ink patterns of this disclosure can also be used to modify the adhesive properties of the adhesive layer to which it is transferred. The modification can take a wide variety of forms from adhesive passivation, to adhesive moderation, to increased adhesion. By this it is meant that the discontinuous ink pattern can be non-adhesive so as to passivate the adhesive layer in those spots on which it is transferred, or the discontinuous ink pattern can be adhesive, having adhesive properties that demonstrate less or greater adhesion than the adhesive layer on which it is transferred. All of these possibilities are described in greater detail below.

One particularly important example where the need for modification of the adhesive properties of an adhesive layer of an article is in the area or graphic articles. Graphic articles generally include a graphic film substrate and an adhesive layer. This process, called passivation, has been described in, for example, U.S. Patent Application No. 62/431,124 filed Dec. 7, 2016, titled "Methods of Passivating Adhesives".

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

As used herein, the term "release liner", used interchangeably with the term "liner", refers to a thin flexible sheet which after being placed in intimate contact with an adhesive surface may be subsequently removed without damaging the adhesive coating.

As used herein, the term "structured liner" refers to a liner with a structured surface, and the term "microstructured liner" refers to a liner with a microstructured surface.

As used herein, the term "backing" refers to a thin, flexible sheet which, after being placed in intimate contact with an adhesive cannot be subsequently removed without damaging the adhesive coating.

As used herein, the term "microscopic" refers to features of small enough dimension so as to require an optic aid to the naked eye when viewed from any plane of view to determine its shape. One criterion is found in Modem Optic Engineering by W. J. Smith, McGraw-Hill, 1966, pages 104-105 whereby visual acuity, " . . . is defined and measured in terms of the angular size of the smallest character that can be recognized." Normal visual acuity is considered to be when the smallest recognizable letter subtends an angular height of 5 minutes of arc on the retina. At a typical working distance of 250 mm (10 inches), this yields a lateral dimension of 0.36 mm (0.0145 inch) for this object.

As used herein, the term "microstructure" means the configuration of features wherein at least 2 dimensions of the features are microscopic. The topical and/or cross-sectional view of the features must be microscopic.

As used herein, the terms "overlaps with and is located within" when used to describe the discontinuous ink layer and the depressions of a microstructured release liner, it is meant that at least a portion of the discontinuous ink layer is present in the depression. The depression can be viewed as having a two-dimensional cross-section on its surface, and at least a portion of the discontinuous ink layer is located within this two-dimensional cross-sectional surface. In embodiments in which the depressions additionally contain particles or clumps of particles, the portion of the discontinuous ink layer that is present in the depression may be present on the topmost surface of the particles or clumps of particles, may be present between the particles or clumps of particles, may be present on the bottom-most surface of the particles or clumps of particles, or a combination thereof.

As used herein, the term "discontinuous ink layer" refers to a layer of ink material that is not continuous, that is to say the layer is present in discrete locations and absent at other locations. The discontinuous ink layer may be continuous macroscopically to form a pattern of detectable information. The discontinuous ink layer may be in the shape of lines, blocks, squares, hexagons, chevrons or other geometric shapes. The discontinuous ink layer may be discontinuous in such a way that the layer forms a pattern of dots of ink material. Additionally, the term discontinuous ink layer encompasses the possibility that the dots of ink material may be further discontinuous such that each ink dot is subdivided into a series of smaller dots.

The terms "Tg" and "glass transition temperature" are used interchangeably. If measured, Tg values are determined by Differential Scanning calorimetry (DSC) at a scan rate of 10° C./minute, unless otherwise indicated. Typically, Tg values for copolymers are not measured but are calculated using the well-known Fox Equation, using the monomer Tg values provided by the monomer supplier, as is understood by one of skill in the art.

The term "room temperature" refers to ambient temperature, generally 20-22° C., unless otherwise noted.

The term "(meth)acrylate" refers to monomeric acrylic or methacrylic esters of alcohols. Acrylate and methacrylate monomers or oligomers are referred to collectively herein as "(meth)acrylates". Polymers described as "(meth)acrylate-based" are polymers or copolymers prepared primarily (greater than 50% by weight) from (meth)acrylate monomers and may include additional ethylenically unsaturated monomers.

The term "adjacent" as used herein when referring to two layers means that the two layers are in proximity with one another with no intervening open space between them. They may be in direct contact with one another (e.g. laminated together) or there may be intervening layers.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The terms "free radically polymerizable" and "ethylenically unsaturated" are used interchangeably and refer to a reactive group which contains a carbon-carbon double bond which is able to be polymerized via a free radical polymerization mechanism.

Unless otherwise indicated, "translucent" refers to a layer, film, or article through which it is capable for an observer to view an object. Typically translucent layers, films, or articles have a luminous transmission of less than 80%, and may have a haze of 10% or greater. Luminous transmission and haze can be measured using well understood techniques, but typically translucence is not measured but rather just observed.

Unless otherwise indicated, "optically transparent" refers to a layer, film, or article that has a high light transmittance over at least a portion of the visible light spectrum (about 400 to about 700 nm) but may have relatively high haze. Typically optically transparent layers, films, or articles have a luminous transmission of at least 90%, and may have a haze of 10% or greater, but may have a lower haze. Luminous transmission and haze can be measured using well understood techniques.

Unless otherwise indicated, "optically clear" refers to an layer, film, or article that has a high light transmittance over at least a portion of the visible light spectrum (about 400 to about 700 nm), and that exhibits low haze. Typically optically clear layers, films, or articles have visible light transmittance values of at least 90%, often at least 95%, and haze values of 5% or less, often 2% or less. Luminous transmission and haze can be measured using well understood techniques.

The present disclosure relates to release liners, to adhesive articles, to modified adhesive layers, and methods for preparing adhesive articles. The interrelation of these features and articles are explained in greater detail below.

Among the embodiments of this disclosure are release liners. These release liners are microstructured release liners that additionally comprise a discontinuous pattern of ink material that is adhesively transferrable. In this way, when an adhesive layer contacts the microstructured surface of the release liner and is removed, the discontinuous pattern of ink material transfers at least in part to the adhesive surface.

In some embodiments, the release liner comprises a release layer with a first major surface and second major surface, where the second major surface of the release layer comprises a first set of microstructured features comprising a plurality of depressions into the second major surface of the release layer, and a discontinuous pattern of ink material located on the second major surface of the release layer. Typically, at least a portion of the discontinuous pattern of ink material overlaps with and is located within some of the depressions. The ink material comprises a non-adhesive but adhesively transferrable material, or an adhesive material, as is described in greater detail below. In some embodiments, the release layer comprises the entire release liner, in other embodiments, the release liner comprises a base layer with a separate release layer. Both embodiments are suitable in the present disclosure.

Microstructured release liners are well-known in the adhesive arts. They may be prepared by a variety of processes including, for example, embossing, depositing, or extrusion processes. Typically, microstructured release liners are prepared by embossing a release liner with an embossable surface to a structured tool to impart a structured surface to the release liner. A structured tool is an implement for imparting a structure or finish to a surface and which may be continuously reused in the process. Typically, the structured tool is a molding tool. Structured molding tools can be in the form of a planar stamping press, a flexible or inflexible belt, or a roller. Furthermore, molding tools are generally considered to be tools from which the structured pattern is generated in the surface by embossing, coating, casting, or platen pressing and do not become part of the finished article. In many embodiments, the structured tool is a microstructured tool, meaning that the tool has a microstructured pattern on its surface.

A broad range of methods are known to those skilled in this art for generating microstructured molding tools. Examples of these methods include but are not limited to photolithography, etching, discharge machining, ion milling, micromachining, and electroforming. Microstructured molding tools can also be prepared by replicating various microstructured surfaces, including irregular shapes and patterns, with a moldable material such as those selected from the group consisting of crosslinkable liquid silicone rubber, radiation curable urethanes, etc. or replicating various microstructures by electroforming to generate a negative or positive replica intermediate or final embossing tool mold. Also, microstructured molds having random and irregular shapes and patterns can be generated by chemical etching, sandblasting, shot peening or sinking discrete structured particles in a moldable material. Additionally any of the microstructured molding tools can be altered or modified according to the procedure taught in U.S. Pat. No. 5,122,902 (Benson). The tools may be prepared from a wide range of materials including metals such as nickel, copper, steel, or metal alloys, or polymeric materials.

Typically the embossable surface is a polymeric release liner or a polymeric or paper release liner with a coating of release material on it. This embossable surface is contacted to the microstructured molding tool under conditions of heat and pressure to form the microstructured release surface. Examples of such microstructured release surfaces and patterns can be those found, for example, in PCT Publications Nos. WO 00/69985 and WO 95/11945, and U.S. Pat. No. 5,141,790.

As is well understood with microstructured release liners, the structures present in the surface of the release liner produce the opposite structures in the adhesive layer that is contacted to the release liner and then removed. For example, protrusions on the release liner surface form depressions in the adhesive layer surface, and depressions in the release liner surface form protrusions in the adhesive layer surface.

It has been found (see for example, U.S. Pat. Nos. 5,296,277 and 5,362,516 both to Wilson et al.) that a combination of depressions and protrusions can be desirable in an adhesive layer surface. Depressions in the adhesive layer surface, especially if the depressions are connected so as to form channels, can provide a mechanism for air egress when the adhesive layer is laminated to a substrate surface. Typically these channels are temporary. Often the channels collapse either spontaneously by the adhesive flowing to fill the channels or upon the application of pressure to the adhesive article through the use of a roller or squeegee, for example. In this way, even large graphic articles can be applied to a substrate surface without air bubbles becoming trapped in the bond line.

Protrusions in the adhesive layer surface, especially protrusions that contain a non-adhesive material on the outer surface of the protrusions, can aid in the positionability and repositionability of the adhesive article. The protrusions inhibit the bulk of the adhesive surface from contacting the substrate by holding the adhesive layer away from the substrate surface to give repositionability. The non-adhesive material on the outer surface of the protrusions inhibits the adhesive protrusions from adhering to the substrate surface to give positionability. Once the adhesive article is appropriately aligned with the substrate surface, the application of pressure to the adhesive article, with, for example, the users hand or with a tool such as a roller or squeegee, presses the non-adhesive material into the bulk of the adhesive layer and permits the adhesion of the adhesive layer to the substrate surface.

The release liners of the present disclosure contain at least microstructured depressions and may also have additional microstructured features such as microstructured protrusions. As described above, the combination of microstructured depressions and microstructured protrusions can provide adhesive articles with the desirable combination of properties of air egress and positionability and repositionability.

In some embodiments, the present disclosure comprises a release liner comprising a release layer with a first major surface and second major surface, where the second major surface of the release layer comprises a first set of microstructured features comprising a plurality of depressions into the second major surface of the release layer, and a discontinuous pattern of ink material located on the second major surface of the release layer. At least a portion of the discontinuous pattern of ink material overlaps with and is located within some of the depressions. The ink material comprises a non-adhesive but adhesively transferrable material, or an adhesive material as described in greater detail below.

The plurality of depressions may be arrayed in a wide range of patterns on the second major surface of the release layer, and may be randomly or non-randomly arrayed. Typically, 1-50% of the area of the second major surface of the release layer may comprise depressions, more typically 1-25% of the area of the second major surface of the release layer may comprise the depressions. The depressions may have a variety of sizes, depths, and shapes. Typically, the depressions have a depth of at least 15 micrometers, and not more than 200 micrometers. While a wide range of shapes are suitable for the depressions, since the depressions are designed to form pegs or posts in the adhesive layer to which they are contacted, generally the depressions have a regular shape such as a square, triangle, rectangle, and the like.

In some embodiments, the depressions comprise particles or clumps of particles contained within the depressions. The particles or clumps of particles can be beads or clumps of beads as described for example in U.S. Pat. Nos. 5,296,277 and 5,362,516 both to Wilson et al. The beads can be organic or inorganic particles, comprising such materials as polymers, glass ceramics, or metals. The particles or clumps of particles do not need to fully fill the depressions, nor do they need to be present in all depressions.

In some embodiments, the second major surface of the release layer further comprises a second set of microstructured features comprising a plurality of protrusions from the second major surface of the release layer. These protrusions can be of a variety of sizes and shapes. Representative examples include hemispheres, prisms (such as square prisms, rectangular prisms, cylindrical prisms and other similar polygonal features), pyramids, ellipses, grooves (e.g., V-grooves), channels, and the like. In general, it is desirable to include topographical features that promote air egress at the bonding interface when the adhesive layer is laminated to an adherend. In this regard, V-grooves and channels that extend to the edge of the article are particularly useful. The particular dimensions and patterns characterizing the microstructural features are selected based upon the specific application for which the article is intended. Typically, the protrusions have an average height above the second major surface of the release layer of 3-200 micrometers, more typically 3-100 micrometers, or even 3-45 micrometers.

The release liner may be monolithic construction, meaning that the entire release liner comprises the release layer, or the release liner may be a composite construction. In a composite construction release liner, the release liner may further comprise a base layer with a first major surface and a second major surface, where the first major surface of the release layer is in contact with the second major surface of the base layer. Examples of composite release liners include, for example, paper liners with a layer of release material disposed on one major surface.

As was mentioned above, besides the depressions and optional protrusions, the release liner also comprises a discontinuous pattern of ink material located on the second major surface of the release layer. At least a portion of the discontinuous pattern of ink material overlaps with and is located within some of the depressions. The pattern of ink material may be random or non-random. Examples where random patterns may be desirable include ones where passivation of the adhesive layer may be a primary concern rather than the pattern providing information. Typically, the pattern of ink material is non-random so as to provide information as well as the other desirable features. Examples of non-random patterns that are suitable are indicia. This indicia can be in form of lot numbers, logos, security information, and the like.

The ink material may comprise a non-adhesive but adhesively transferrable material, or an adhesive material. If the ink material is an adhesive material, it generally has different adhesive properties from the adhesives that are contacted to the release liner. In some embodiments, it can be desirable to utilize an ink material that is an adhesive material so that the areas on the adhesive surface to which the ink material is transferred retain some adhesive properties.

The ink material comprises a polymeric material or a pre-polymeric material that upon curing forms a polymeric material. The polymeric material upon application to the release layer surface in a discontinuous pattern is typically dried and/or cured to form a polymeric matrix. The polymeric matrix can comprise a wide range of materials, and may contain a wide range of additives. Some of the additives include additives that enable the discontinuous ink material to be detected by a variety of means, such as light, magnetic, or thermal means. Typically the ink material comprises a pigment or dye so that the areas that contain the ink material are visible to the naked eye. In other embodiments, the ink material may contain a fluorescent material or a material visible only under ultraviolet or infrared light.

While typically it is desirable that the ink material be visible on the adhesive layer to which it is transferred, in some embodiments it may be desirable that the ink material not be visible through the adhesive layer. For example, in articles comprising a film layer with an adhesive layer disposed on it, if the film layer is translucent or transparent, the ink material may be visible when viewed through the film layer and the adhesive layer. This visibility can be minimized by, for example, matching the refractive index of the ink material with the refractive index of the adhesive layer to which it is transferred.

In some embodiments, the ink material comprises a non-adhesive but adhesively transferrable material. A wide range of ink materials that are non-adhesive but adhesively transferrable are known and are suitable. Among the suitable ink materials are those that contain polymeric materials or upon curing form polymeric materials. Examples of suitable polymeric materials are nitrocelluloses, acrylics and methacrylics, polyvinyl butyrals (PVB), polyvinyl alcohols (PVA), polyurethanes (PU), and mixtures thereof. Examples of suitable commercially available ink materials are described in the Examples section, below.

In other embodiments, the ink material comprises an adhesive material. A wide range of adhesive materials are known and are suitable. Among the suitable ink materials are those that contain polymeric materials or upon curing form polymeric materials. Examples of suitable polymeric materials are natural rubbers, synthetic rubbers, styrene block copolymers, polyvinyl ethers, poly(meth)acrylates, polyolefins, silicones, and mixtures thereof. These classes of adhesive materials are described in greater detail below.

Particularly suitable adhesive materials for use as the ink material are those described in U.S. Application No. 62/608,678 filed Dec. 21, 2017 titled "Adhesive Articles Including a Cushion Layer and a Discontinuous Shell Layer" for the discontinuous shell layers. These materials are (meth)acrylate copolymers with a Tg (as calculated by the Fox equation) of from +10-+50° C., which are copolymers of (meth) acrylate monomers, polar monomers, and high Tg nonpolar monomers.

The ink material may comprise a variety of optional additives including solvents, fillers, antioxidants, rheology modifiers, surfactants, crosslinkers, as well as the pigments and dyes described above.

The discontinuous pattern of ink material can be applied to the release layer by a wide variety of coating, printing or other patterning techniques. Printing techniques are particularly suitable, as these techniques provide excellent control in the formation of discontinuous patterns. Examples of suitable printing techniques include screen printing, inkjet printing, flexographic printing, gravure printing, offset printing, needle dispensing, and patch coating.

In some embodiments, the discontinuous pattern of ink material is prepared by applying an ink material to the second major surface of the release layer by printing techniques. Upon application of the ink material to the second major surface of the release layer, the printed ink material can be cured and/or dried. The curing and drying can be carried out by the application of heat, such as placing the release liner in an oven, by the application of radiation such as ultraviolet light by exposure to light source, or by a combination of application of heat and radiation.

In some embodiments, the ink material fills only a portion of the depressions with which it overlaps. In other embodiments, the ink material fully fills the depressions with which it overlaps. As was mentioned above, in many embodiments at least some of the depressions of the release liner also contains particles or clumps of particles. It has been observed that even if the ink material fully fills the depression with which it overlaps, the particles or clumps of particles contained within the depression are still at least partially transferred to the adhesive layer when an adhesive layer is contacted to the release liner. While not wishing to be bound by theory, it is believed that at least some of the ink material at least partially fills gaps between the particles or clumps of particles and thus becomes intimately associated with the particles or clumps of particles. In this way, if the ink material fully fills the depression, this intimate association permits the particles or clumps of particles to remain associated with the ink material when the release liner is removed. In embodiments where the ink material does not fully fill the depressions and the depressions are therefore filled by adhesive when the liner is contacted to the adhesive layer, the ink material and particles or clumps of particles are both adhered to the adhesive layer when the release liner is removed. Since the purpose of the particles or clumps of particles is to provide positionability and repositionability to the adhesive article, it is desirable that the presence of the ink material not alter or destroy this desirable feature.

As was mentioned above, the ink material is typically applied in a pattern to provide indicia on the surface of an adhesive article upon transfer from the release liner upon which the ink material is applied. It is typically not necessary or desirable for the entire surface of the adhesive article to contain indicia, rather the indicia is typically scattered across the surface of the adhesive article. Therefore, it is not necessary for all of the depressions present on the second major surface of the release layer to have overlapping ink material. The number of depressions that are overlapped with ink material depends upon a wide range of factors.

Typically when the ink material is non-adhesive but adhesively transferrable, less than 50% of the depressions present of the second major surface of the release layer have overlapping ink material. In some embodiments, the ink material overlaps with 0.10-30% of the depressions on the surface of the second major surface of the release layer.

In embodiments where the ink material is an adhesive material that is different from the adhesive material of the adhesive layer to which it is transferred, higher numbers of the depressions may have overlapping ink material. This is because the ink material has adhesive properties, the surface area of the adhesive layer is not rendered non-adhesive by the transfer of the ink material to the adhesive layer. In these embodiments, the ink material can overlap with 5-80% of the depressions on the surface of the second major surface of the release layer. Higher levels of ink material overlap can be desirable especially when adhesive layer passivation is one of the desired goals of transferred ink material, as has been described above.

Also disclosed herein are adhesive articles. In some embodiments, the adhesive article comprises a release liner, where the release liner comprises a release layer with a first major surface and second major surface, and an adhesive layer with a first major surface and a second major surface, where the first major surface of the adhesive layer is in contact with the second major surface of the release layer. The release liners have been described above, where the second major surface of the release layer comprises a first set of microstructured features comprising a plurality of depressions into the second major surface of the release layer, and a discontinuous pattern of ink material located on the second major surface of the release layer. As described above, at least a portion of the discontinuous pattern of ink material overlaps with and is located within some of the depressions.

Typically, the adhesive article further comprises a substrate in contact with the second major surface of the adhesive layer. A wide variety of substrates are suitable in the articles of this disclosure, provided they can be processed using the methods described below. Particularly suitable substrates include films, tape backings, graphic articles, plastic articles, wound dressings, protection films or tapes, rigid or semi-rigid plates or sheets, or release liners.

Examples of films include a wide range of polymeric films prepared from a variety of materials and of a wide range of thicknesses. The films may be of a single layer or multi-layer construction. Other examples of suitable films include barrier films, solar films such as light redirecting films, and electronic films such as electrically conductive films. Examples of polymeric films include films comprising one or more polymers such as cellulose acetate butyrate; cellulose acetate propionate; cellulose triacetate; poly(meth) acrylates such as polymethyl methacrylate; polyesters such as polyethylene terephthalate, and polyethylene naphthalate; copolymers or blends based on naphthalene dicarboxylic acids; polyether sulfones; polyurethanes; polycarbonates; polyvinyl chloride; syndiotactic polystyrene; cyclic olefin copolymers; silicone-based films; and polyolefins including polyethylene and polypropylene such as cast and biaxially oriented polypropylene. The film may be primed or treated to impart some desired property to one or more of its surfaces. Examples of such treatments include corona, flame, plasma and chemical treatments.

Examples of tape backings include a wide range of materials including polymeric films such as those described above, metal films, paper, creped paper, foams and the like. The tape backings may be opaque, optically transparent, or optically clear depending upon the desired use for the tape. The tape backing may be single layer or a multi-layer construction.

Examples of graphic articles include a wide variety of articles that contain a graphic image. The graphic articles may be opaque, translucent, or optically transparent, depending upon the desired use for the graphic article. Often graphic articles are multi-layer articles and may contain multiple layers of films, metal or metal oxide layers, adhesives, etc. Examples of graphic articles include decorative films, bumper stickers, decals, display films, and the like.

In some embodiments, the adhesive layer comprises a pressure sensitive adhesive layer. A wide range of pressure sensitive adhesives are suitable. Pressure sensitive adhesives useful in the present disclosure include, for example, those based on synthetic rubbers, styrene block copolymers, polyvinyl ethers, poly(meth)acrylates (including both acrylates and methacrylates), polyolefins, and silicones. Combinations of these adhesives can be used in the pressure sensitive adhesive component.

The pressure sensitive adhesive may be inherently tacky. If desired, tackifiers may be added to a base material to form the pressure sensitive adhesive. Useful tackifiers include, for example, rosin ester resins, aromatic hydrocarbon resins, aliphatic hydrocarbon resins, mixed aromatic/aliphatic hydrocarbon resins, and terpene resins. Other materials can be added for special purposes, including, for example, oils, plasticizers, antioxidants, ultraviolet ("UV") stabilizers, hydrogenated butyl rubber, pigments, curing agents, and crosslinkers as described below.

In a particularly suitable embodiment, the pressure sensitive adhesive is based on at least one poly(meth)acrylate (i.e., a (meth)acrylic pressure sensitive adhesive). Particularly suitable poly(meth)acrylates are derived from: (A) at least one monoethylenically unsaturated alkyl (meth) acrylate monomer (i.e., alkyl acrylate and alkyl methacrylate monomer); and (B) at least one monoethylenically unsaturated free-radically copolymerizable reinforcing monomer. The reinforcing monomer has a homopolymer glass transition temperature (Tg) higher than that of the alkyl (meth) acrylate monomer and is one that increases the glass transition temperature and cohesive strength of the resultant copolymer.

Typically, the monomers used in preparing the pressure sensitive adhesive component of the present disclosure include: (A) a monoethylenically unsaturated alkyl (meth) acrylate monomer that, when homopolymerized, generally has a glass transition temperature (Tg) of no greater than about 0° C.; and (B) a monoethylenically unsaturated free-radically copolymerizable reinforcing monomer that, when homopolymerized, generally has a glass transition temperature of at least about 10° C. The glass transition temperatures of the homopolymers of monomers A and B can be measured by differential scanning calorimetry but more typically are calculated using the well-known Fox equation.

Monomer A, which is a monoethylenically unsaturated alkyl acrylate or methacrylate (i.e., (meth)acrylic acid ester), contributes to the flexibility and tack of the copolymer of the adhesive component. Generally, monomer A has a homopolymer Tg of no greater than about 0° C. Generally, the alkyl group of the (meth)acrylate has an average of about 4 to about 20 carbon atoms, and more typically, an average of about 4 to about 14 carbon atoms. The alkyl group can optionally contain oxygen atoms in the chain thereby forming ethers or alkoxy ethers, for example. Examples of monomer A include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Other examples include, but are not limited to, poly-ethoxylated or -propoxylated methoxy (meth)acrylates such as acrylates of CARBOWAX (commercially available from Union Carbide) and NK ester AM90G (commercially available from Shin Nakamura Chemical, Ltd., Japan). Particularly suitable monoethylenically unsaturated (meth)acrylates that can be used as monomer A include isooctyl acrylate, 2-ethyl-hexyl acrylate, and n-butyl acrylate.

Monomer B, which is a monoethylenically unsaturated free-radically copolymerizable reinforcing monomer, increases the glass transition temperature and cohesive strength of the copolymer. Generally, monomer B has a homopolymer Tg of at least about 10° C. More typically, monomer B is a reinforcing (meth)acrylic monomer, including an acrylic acid, a methacrylic acid, an acrylamide, or a (meth)acrylate. Examples of monomer B include, but are not limited to, acrylamides, such as acrylamide, methacrylamide, N-methyl acrylamide, N-ethyl acrylamide, N-hydroxyethyl acrylamide, diacetone acrylamide, N,N-dimethyl acrylamide, N, N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, and N-octyl acrylamide. Other examples of monomer B include itaconic acid, crotonic acid, maleic acid, fumaric acid, 2,2-(diethoxy)ethyl acrylate, 2-hydroxyethyl acrylate or methacrylate, 3-hydroxypropyl acrylate or methacrylate, methyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, and N-vinyl caprolactam. Exemplary reinforcing acrylic monomers that can be used as monomer B include acrylic acid and acrylamide. Combinations of various reinforcing monoethylenically unsaturated monomers categorized as a B monomer can be used to make the copolymer used in making the adhesive layer.

Generally, the acrylate copolymer is formulated to have a resultant Tg of less than about 25° C. and more typically, less than about 0° C. Such acrylate copolymers generally include about 60 parts to about 98 parts per hundred of at least one monomer A and about 2 parts to about 40 parts per hundred of at least one monomer B. Generally, the acrylate copolymers have about 85 parts to about 98 parts per hundred or at least one monomer A and about 2 parts to about 15 parts of at least one monomer B.

A crosslinking agent can be used if so desired to build the molecular weight and the strength of the copolymer of the adhesive component. Generally, the crosslinking agent is one that is copolymerized with monomers A and B. The crosslinking agent may produce chemical crosslinks (e.g., covalent bonds or ionic bonds). Alternatively, it may produce thermal reversible physical crosslinks that result, for example, from the formation of reinforcing domains due to phase separation of hard segments (i.e., those having a Tg higher than room temperature, generally higher than 70° C.) and/or acid/base interactions (i.e., those involving functional groups within the same polymer or between polymers or between a polymer and an additive). Suitable crosslinking occurs through the use of macromers, such as the styrene macromers of U.S. Pat. No. 4,554,324 (Husman), or polymeric ionic crosslinking as described in WO 99/42536. Suitable crosslinking agents are also disclosed in U.S. Pat. No. 4,737,559 (Kellen), U.S. Pat. No. 5,506,279 (Babu et al.), and U.S. Pat. No. 6,083,856 (Joseph et al.).

If used, the crosslinking agent is used in an effective amount, by which is meant an amount that is sufficient to cause crosslinking of the pressure sensitive adhesive to provide adequate cohesive strength to produce the desired final adhesion properties to the substrate of interest. Typically, if used, the crosslinking agent is used in an amount of about 0.1 part to about 10 parts, based on the total amount of monomers.

Also disclosed herein are modified adhesive layers, where the modified adhesive layer is the adhesive layer of the adhesive articles described above where the release liner has been removed.

In some embodiments, the modified adhesive layer comprises an adhesive layer with a first major surface and a second major surface, where the first major surface comprises a modified adhesive surface. The modified adhesive surface comprises a first set of microstructured features comprising a plurality of protrusions from the first major surface of the adhesive layer; where some of the protrusions comprise the adhesive material of the adhesive layer, and other protrusions comprise the adhesive layer material and ink material, wherein the ink material comprises a non-adhesive material, or an adhesive material that is different from the adhesive material of the adhesive layer, as described above.

Generally, the modified adhesive surface further comprises ink material on the adhesive surface in locations that are not the plurality of protrusions from the first major surface of the adhesive layer.

In many embodiments, some of the protrusions comprise adhesive material of the adhesive layer and further comprise particles or clumps of particles, and other protrusions comprise the adhesive layer material and ink material, and further comprise particles or clumps of particles.

Typically, when an adhesive layer is modified by a microstructured release liner, the structures imparted to the adhesive layer by the microstructured release liner are temporary and only affect the surface of the adhesive layer that contacts the microstructured release liner. In other words, the adhesive layer when contacted to a microstructured release liner is only modified where the adhesive layer contacts the microstructured release liner, i.e. the other surface of the adhesive layer that is typically contacted to a film or substrate is unaffected by the adhesive modification. The desirable effects of the adhesive layer modification by microstructured release liners have been described in some detail above. Among these effects are air egress, repositionability and positionability. Air egress can be effected through channels imparted in the adhesive layer surface by protrusions in the microstructured release liner, an effect that is temporary with the channels typically collapsing upon the application of pressure. Repositionability and positionability can be affected by the impartation of protrusions, often in the shape of posts, in the adhesive layer by depressions in the microstructured release liner, where the depressions frequently contain particles or clumps of particles. The particles or clumps of particles generally are transferred to the adhesive protrusions providing a non-adhesive surface to contact a substrate and provide the repositionability (slidability) and positionability (ability to remove and readhere). This effect is also generally temporary, and upon the application of pressure the protrusions collapse and the particles or clumps of particles are pressed into the bulk of the adhesive layer and effectively disappear.

In some embodiments, the transfer of the ink material to the surface of the adhesive layer does not alter these desirable effects but rather adds another desirable feature to the adhesive layer, such as detectable indicia, adhesive layer passivation, and the like as described above. In these embodiments, the ink material, like the microstructured features imparted from the release liner, only modify the surface of the adhesive layer. In other embodiments, it may be desirable to utilize the ink material to further modify the adhesive article. This is particularly true for some graphic articles where the article comprises a graphic film and an adhesive layer adhered to the graphic film. For example, in some embodiments it may be desirable that upon lamination of the adhesive article to an adherend surface with the application of pressure for the ink material pattern to be visible in or on the graphic film. This can be achieved with ink material patterns that are highly colored so that the ink material pattern is visible through a transparent or translucent graphic film. In some embodiments, the ink material patterns are sufficiently thick and are not completely pressed into the bulk of the adhesive layer, and thus upon the application of pressure, the ink material pattern presses into the graphic film to form a raised pattern. The raised pattern formed in the graphic film may be a visible pattern, or it may be a pattern that can be felt by passing the hand over the graphic film. Such raised patterns in graphic films can be used to supply decorative or security features which do not require printing onto the graphic film itself.

Also disclosed herein are methods of preparing adhesive articles. In some embodiments, the method of preparing an adhesive article comprises providing a release liner, where the release liner is a modified microstructured release liner, providing an adhesive layer or an adhesive layer precursor material, contacting the adhesive layer or the adhesive layer precursor material to the second major surface of the release layer to form an adhesive layer with a first major surface and a second major surface where the first major surface of the formed adhesive layer is in contact with the second major surface of the release layer, and removing the adhesive layer from the release layer to generate a modified adhesive layer.

The modified microstructured release liners have been described above. The release liner comprises a release layer with a first major surface and a second major surface, comprising a first set of microstructured features comprising a plurality of depressions into the second major surface of the release layer, and a discontinuous pattern of ink material located on the second major surface of the release layer, wherein at least a portion of the discontinuous pattern of ink material overlaps with and is located within some of the depressions, wherein the ink material comprises a non-adhesive but adhesively transferrable material, or an adhesive material. In some embodiments, the release liner comprises a second set of microstructured features comprising a plurality of protrusions from the second major surface of the release layer. Also, in many embodiments, at least some of the depressions into the second major surface of the release layer further comprise particles or clumps of particles. These features are described in greater detail above.

In some embodiments, providing the modified microstructured release liner comprises providing a microstructured release liner comprising a plurality of depressions into the second major surface of the release layer. As mentioned above, the microstructured release liner may optionally further comprise a plurality of protrusions from the second major surface of the release layer. Also, in many embodiments, at least some of the depressions into the second major surface of the release layer further comprise particles or clumps of particles. These features are described in greater detail above.

The microstructured release liner is modified by contacting a portion of the second major surface of the release layer with an ink material in a discontinuous pattern. As mentioned above, this ink composition may be a polymeric composition or a curable composition that forms a polymeric material upon curing. The ink material comprises either a non-adhesive but adhesively transferrable material, or an adhesive material. If the ink material is an adhesive material, it is not the same material as the adhesive layer to which the modified release liner is to be contacted.

The discontinuous pattern of ink material may be contacted to the second major surface of the release layer in a wide variety of ways. Because the ink material is selectively contacted to the second major surface, the use of printing techniques is particularly suitable. Among the suitable printing techniques include screen printing, inkjet printing, flexographic printing, gravure printing, offset printing, needle dispensing, and patch coating. The ink material is contacted to the second major surface in such a way that the discontinuous pattern of ink material overlaps with and is located within some of the depressions located on the second major surface of the release layer.

In embodiments in which the depressions located on the second major surface of the release layer contain particles or clumps of particles, the presence of the ink material does not prevent the transfer of the particles or clumps of particles to the adhesive layer when the adhesive layer is contacted to the release liner. In this way, the presence of the ink material on the release liner surface does not adversely affect the transfer of the particles or clumps of particles to the adhesive layer. Thus the advantageous properties of the particles or clumps of particles, such as positionability and repositionability, are not adversely affected by the ink material. This permits the combination of positionability and repositionability with a discontinuous pattern of ink material.

In many embodiments, the ink material is a polymeric composition dissolved in a solvent. Typically, the ink material further comprises additives such as colorants, dispersants, fillers and the like. Upon deposition of the ink material mixture to the release liner surface, the ink material is typically dried to remove the solvent. This drying can be effected by the application of heat, for example by placing the ink contacted release liner in an oven. If the ink material is curable, the ink material can be cured either in a separate step or simultaneously with the drying. Examples of curing mechanisms include exposure to actinic radiation such as UV radiation through the use of lamps.

As mentioned above, an adhesive layer or an adhesive layer precursor material is contacted to the second major surface of the release layer to form an adhesive layer with a first major surface and a second major surface where the first major surface of the formed adhesive layer is in contact with the second major surface of the release layer. By adhesive layer precursor material it is meant a curable material that upon curing forms an adhesive layer. In other embodiments, the adhesive layer has already been formed and the adhesive layer is laminated to the release layer. The second major surface of the adhesive layer may be in contact with a substrate. A wide range of substrates are suitable, including release liners, tape backings and films as are described above. Graphic films are particularly suitable substrates. While both methods are suitable, that is to say either contacting an adhesive layer or an adhesive layer precursor material to the release layer, the formed adhesive articles may have different properties depending upon how the adhesive layer is contacted to the release liner. For example, depending upon the characteristics of the adhesive layer, the amount that the adhesive layer wets the release layer surface and penetrates the depressions in the release layer may vary, but at least some of the adhesive layer penetrates the depressions.

The adhesive layer is subsequently removed from the release layer to generate a modified adhesive layer. Modified adhesive layers have been described above. In the process of the removal of the adhesive layer from the release layer, at least some of the ink material is transferred from the release layer to the adhesive layer. The modified adhesive layer surface is contacted to the surface of an adherend, and sufficient pressure is applied to adhere the modified adhesive layer to the surface of the adherend substrate. Examples of adherend substrates to which the modified adhesive layer is attached include surfaces such as a window, the side of a building, the side of a truck, train, subway or other transportation vehicle, billboards, and the like.

The present disclosure can be further understood by referring to FIGS. 1-5. FIG. 1 shows microstructured liner 100 which has optional protrusions 110 and depressions 120, with particles or particle clumps 130 located in at least some of the depressions 120.

Figure 2:
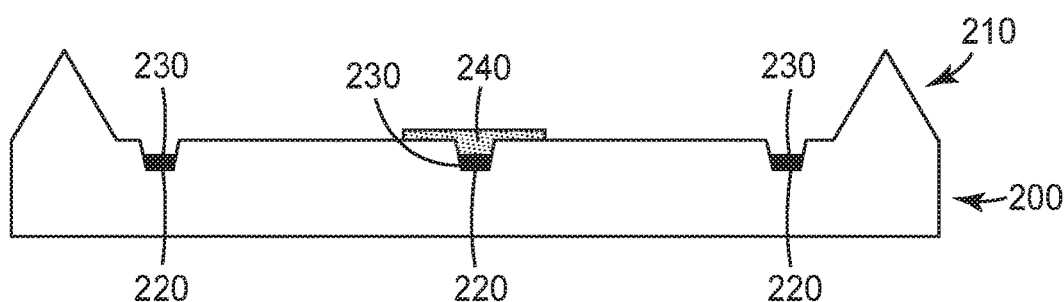
FIG. 2 is a cross sectional view of the release liner of FIG. 1 that has been modified by printing according to the methods of the present disclosure.

FIG. 2 shows modified release liner 200 which is the microstructured liner of FIG. 1, where the microstructured liner has been modified by printing. Modified liner 200 has protrusions 210, depressions 220 with particles or particle clumps 230 located in the depressions 220, and ink pattern 240 which covers depression 220 and the ink is in contact with the particles or particle clumps 230.

Figure 3:
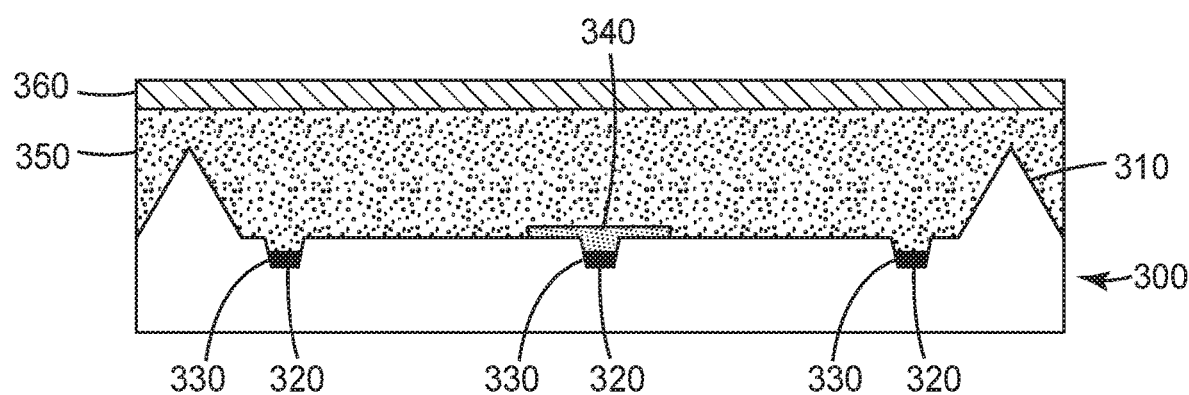
FIG. 3 is a cross sectional view of the modified release liner of FIG. 2 in contact with an adhesive construction.

FIG. 3 shows adhesive article 300 which has the release liner from FIG. 2 in contact with an adhesive layer and a backing. Adhesive article 300 shows the release layer with protrusions 310, depressions 320 with particles or particle clumps 330, and ink pattern 340 as in FIG. 2, with adhesive layer 350 in contact with the release liner and filling the depressions and contacting the particles or particle clumps 330 and contacting the ink pattern 340. Optional backing layer 360 is in contact with adhesive layer 350.

Figure 4:
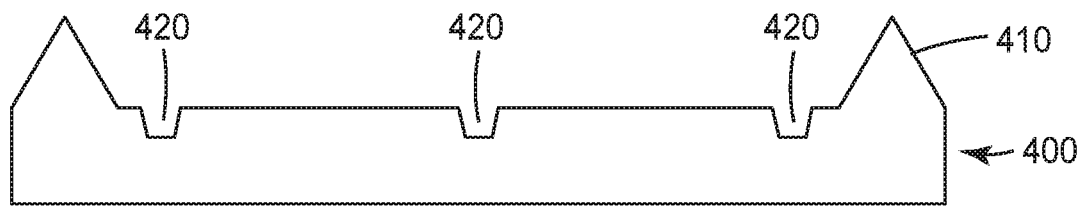
FIG. 4 is a cross sectional view of the release liner of FIG. 3 after the adhesive construction has been removed.
Figure 5:
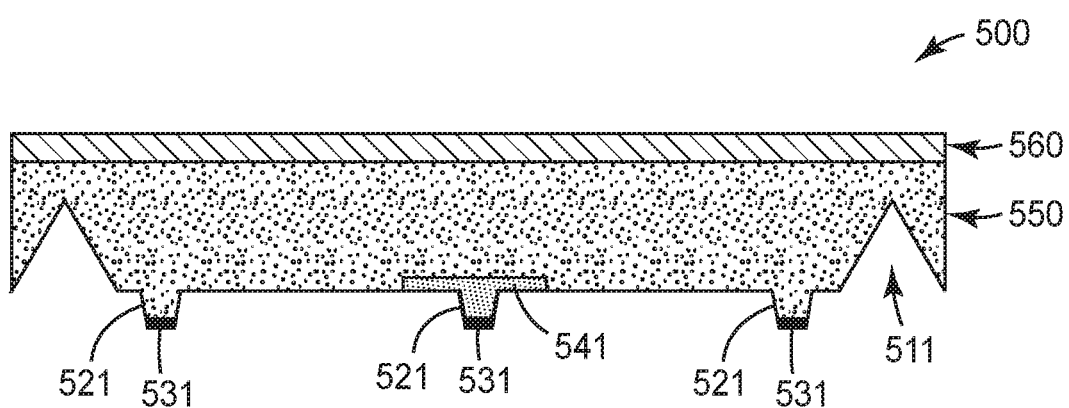
FIG. 5 is a cross sectional view of the modified adhesive article formed when the adhesive construction of FIG. 3 has been removed from the release liner.

When the adhesive layer is removed from the release liner of article 300 of FIG. 3, the articles shown in FIGS. 4 and 5 are formed. FIG. 4 shows liner article 400 with protrusions 410 and depressions 420, where the particles or particle clumps and the ink pattern have been transferred to the adhesive layer and thus are absent from the liner article.

FIG. 5 is the modified adhesive article 500 which contains optional backing 560, and modified adhesive layer 550, which has depressions 511 (resulting from protrusions from the release liner) and protrusions 521 (resulting from the depressions of the release liner), with particles or particle clumps 531 located on the tops of the protrusions 521, and transferred ink pattern 541 located on protrusion 521.

The disclosure includes the following embodiments:

Among the embodiments are release liners. Embodiment 1 is a release liner comprising: a release layer with a first major surface and second major surface, wherein the second major surface of the release layer comprises: a first set of microstructured features comprising a plurality of depressions into the second major surface of the release layer; and a discontinuous pattern of ink material located on the second major surface of the release layer, wherein at least a portion of the discontinuous pattern of ink material overlaps with and is located within some of the depressions, wherein the ink material comprises a non-adhesive but adhesively transferrable material, or an adhesive material.

Embodiment 2 is the release liner of embodiment 1, wherein the ink material comprises a non-adhesive but adhesively transferrable polymeric material selected from nitrocelluloses, acrylics and methacrylics, polyvinyl butyrals (PVB), polyvinyl alcohols (PVA), polyurethanes (PU), and mixtures thereof.

Embodiment 3 is the release liner of embodiment 1, wherein the ink material comprises an adhesive polymeric material selected from natural rubbers, synthetic rubbers, styrene block copolymers, polyvinyl ethers, poly(meth)acrylates, polyolefins, silicones, and mixtures thereof.

Embodiment 4 is the release liner of embodiment 3, wherein the adhesive polymeric material comprises a (meth)acrylate copolymer with a Tg (as calculated by the Fox equation) of from +10-+50° C., and are copolymers of (meth)acrylate monomers, polar monomers, and high Tg nonpolar monomers.

Embodiment 5 is the release liner of any of embodiments 1-4, wherein the ink material has been printed onto the second major surface of the release layer.

Embodiment 6 is the release liner of embodiment 5, wherein the printed ink material has been cured and/or dried.

Embodiment 7 is the release liner of any of embodiments 1-6, wherein the plurality of depressions further comprise particles or clumps of particles contained within the depressions.

Embodiment 8 is the release liner of any of embodiments 1-7, wherein the depressions have an average depth of 15-200 micrometers.

Embodiment 9 is the release liner of any of embodiments 1-8, wherein the second major surface of the release layer comprises: a second set of microstructured features comprising a plurality of protrusions from the second major surface of the release layer.

Embodiment 10 is the release liner of embodiment 9, wherein the protrusions have an average height above the second major surface of the release layer of 3-200 micrometers.

Embodiment 11 is the release liner of embodiment 9, wherein the protrusions have an average height above the second major surface of the release layer of 3-100 micrometers.

Embodiment 12 is the release liner of embodiment 9, wherein the protrusions have an average height above the second major surface of the release layer of 3-45 micrometers.

Embodiment 13 is the release liner of any of embodiments 1-12, wherein the ink material fully fills the depressions with which it overlaps.

Embodiment 14 is the release liner of any of embodiments 1-13, wherein the ink material comprises a non-adhesive but adhesively transferrable material and the ink material overlaps with 0.1-30% of the depressions on the surface of the second major surface of the release layer.

Embodiment 15 is the release liner of any of embodiments 1-13, wherein the ink material comprises an adhesive material and the ink material overlaps with 5-80% of the depressions on the surface of the second major surface of the release layer.

Embodiment 16 is the release liner of any of embodiments 1-15, wherein the release liner is a composite release liner further comprising a base layer with a first major surface and a second major surface, wherein the first major surface of the release layer is in contact with the second major surface of the base layer.

Also disclosed are adhesive articles. Embodiment 17 is an adhesive article comprising: a release liner, wherein the release liner comprises: a release layer with a first major surface and second major surface, wherein second major surface of the release layer comprises: a first set of microstructured features comprising a plurality of depressions into the second major surface of the release layer; and a discontinuous pattern of ink material located on the second major surface of the release layer, wherein at least a portion of the discontinuous pattern of ink material overlaps with and is located within some of the depressions, wherein the ink material comprises a non-adhesive but adhesively transferrable material, or an adhesive material; and an adhesive layer with a first major surface and a second major surface, wherein the first major surface in contact with the second major surface of the release layer.

Embodiment 18 is the adhesive article of embodiment 17, further comprising a substrate in contact with the second major surface of the adhesive layer.

Embodiment 19 is the adhesive article of embodiment 17 or 18, wherein the adhesive layer comprises a pressure sensitive adhesive layer.

Embodiment 20 is the adhesive article of embodiment 19, wherein the pressure sensitive adhesive selected from natural rubbers, synthetic rubbers, styrene block copolymers, polyvinyl ethers, poly(meth)acrylates, polyolefins, silicones, and mixtures thereof.

Embodiment 21 is the adhesive article of any of embodiments 17-20, wherein the ink material comprises a non-adhesive but adhesively transferrable polymeric material selected from nitrocelluloses, acrylics and methacrylics, polyvinyl butyrals (PVB), polyvinyl alcohols (PVA), polyurethanes (PU), and mixtures thereof.

Embodiment 22 is the adhesive article of any of embodiments 17-20, wherein the ink material comprises an adhesive polymeric material selected from natural rubbers, synthetic rubbers, styrene block copolymers, polyvinyl ethers, poly(meth)acrylates, polyolefins, silicones, and mixtures thereof.

Embodiment 23 is the adhesive article of embodiment 22, wherein the adhesive polymeric material comprises a (meth)acrylate copolymer with a Tg (as calculated by the Fox equation) of from +10-+50° C., and are copolymers of (meth)acrylate monomers, polar monomers, and high Tg nonpolar monomers.

Embodiment 24 is the adhesive article of any of embodiments 17-23, wherein the ink material has been printed onto the second major surface of the release layer.

Embodiment 25 is the adhesive article of embodiment 24, wherein the printed ink material has been cured and/or dried.

Embodiment 26 is the adhesive article of any of embodiments 17-25, wherein the plurality of depressions further comprise particles or clumps of particles contained within the depressions.

Embodiment 27 is the adhesive article of any of embodiments 17-26, wherein the depressions have an average depth of 15-200 micrometers.

Embodiment 28 is the adhesive article of any of embodiments 17-27, wherein the second major surface of the release layer comprises: a second set of microstructured features comprising a plurality of protrusions from the second major surface of the release layer.

Embodiment 29 is the adhesive article of embodiment 28, wherein the protrusions have an average height above the second major surface of the release layer of 3-200 micrometers.

Embodiment 30 is the adhesive article of embodiment 28, wherein the protrusions have an average height above the second major surface of the release layer of 3-100 micrometers.

Embodiment 31 is the adhesive article of embodiment 28, wherein the protrusions have an average height above the second major surface of the release layer of 3-45 micrometers.

Embodiment 32 is the adhesive article of any of embodiments 17-31, wherein the ink material fully fills the depressions with which it overlaps.

Embodiment 33 is the adhesive article of any of embodiments 17-32, wherein the ink material comprises a non-adhesive but adhesively transferrable material and the ink material overlaps with 0.1-30% of the depressions on the surface of the second major surface of the release layer.

Embodiment 34 is the adhesive article of any of embodiments 17-32, wherein the ink material comprises an adhesive material and the ink material overlaps with 5-80% of the depressions on the surface of the second major surface of the release layer.

Embodiment 35 is the adhesive article of any of embodiments 17-34, wherein the release liner is a composite release liner further comprising a base layer with a first major surface and a second major surface, wherein the first major surface of the release layer is in contact with the second major surface of the base layer.

Also disclosed are modified adhesive layers. Embodiment 36 is a modified adhesive layer comprising: an adhesive layer with a first major surface and a second major surface, wherein the first major surface comprises a modified adhesive surface, wherein the modified adhesive surface comprises a first set of microstructured features comprising a plurality of protrusions from the first major surface of the adhesive layer; wherein some of the protrusions comprise the adhesive material of the adhesive layer, and other protrusions comprise the adhesive layer material and a covering layer of an ink material, wherein the ink material comprises a non-adhesive material, or an adhesive material that is different from the adhesive material of the adhesive layer.

Embodiment 37 is the modified adhesive layer of embodiment 36, wherein the modified adhesive surface further comprises ink material on the adhesive surface in locations that are not the plurality of protrusions from the first major surface of the adhesive layer.

Embodiment 38 is the modified adhesive layer of embodiment 36 or 37, wherein some of the protrusions comprising adhesive material of the adhesive layer further comprise particles or clumps of particles, and wherein the other protrusions comprising the adhesive layer material and ink material further comprise particles or clumps of particles.

Also disclosed are methods of preparing adhesive articles. Embodiment 39 is a method or preparing an adhesive article comprising: providing a modified microstructured release liner, wherein the modified microstructured release liner comprises a release layer with a first major surface and a second major surface, comprising: a first set of microstructured features comprising a plurality of depressions into the second major surface of the release layer; and a discontinuous pattern of ink material located on the second major surface of the release layer, wherein at least a portion of the discontinuous pattern of ink material overlaps with and is located within some of the depressions, wherein the ink material comprises a non-adhesive but adhesively transferrable material, or an adhesive material; providing an adhesive layer or an adhesive layer precursor material; contacting the adhesive layer or the adhesive layer precursor material to the second major surface of the release layer to form an adhesive layer with a first major surface and a second major surface wherein the first major surface of the formed adhesive layer is in contact with the second major surface of the release layer; and removing the adhesive layer from the release layer to generate a modified adhesive layer.

Embodiment 40 is the method of embodiment 39, wherein providing a modified microstructured release liner, comprises: providing a microstructured release liner with a first major surface and a second major surface, where the second major surface is a release surface, and a plurality of depressions in the second major surface of the release liner; printing a discontinuous pattern of ink material onto the second major surface of the release liner such that at least some of ink material overlaps with and is located within some of the depressions; and drying and/or curing the ink material.

Embodiment 41 is the method of embodiment 39 or 40, further comprising: providing a substrate with a surface; contacting the modified adhesive layer surface to the surface of the substrate; and applying sufficient pressure to adhere the modified adhesive layer to the surface of the substrate.

Embodiment 42 is the method of any of embodiments 39-41, wherein the ink material comprises a non-adhesive but adhesively transferrable polymeric material selected from nitrocelluloses, acrylics and methacrylics, polyvinyl butyrals (PVB), polyvinyl alcohols (PVA), polyurethanes (PU), and mixtures thereof.

Embodiment 43 is the method of any of embodiments 39-41, wherein the ink material comprises an adhesive polymeric material selected from natural rubbers, synthetic rubbers, styrene block copolymers, polyvinyl ethers, poly (meth)acrylates, polyolefins, silicones, and mixtures thereof.

Embodiment 44 is the method of embodiment 43, wherein the adhesive polymeric material comprises a (meth)acrylate copolymer with a Tg (as calculated by the Fox equation) of from +10-+50° C., and are copolymers of (meth)acrylate monomers, polar monomers, and high Tg nonpolar monomers.

Embodiment 45 is the method of any of embodiments 39-44, wherein the ink material has been printed onto the second major surface of the release layer.

Embodiment 46 is the method of embodiment 45, wherein the printed ink material has been cured and/or dried.

Embodiment 47 is the method of any of embodiments 39-46, wherein the plurality of depressions further comprise particles or clumps of particles contained within the depressions.

Embodiment 48 is the method of any of embodiments 39-47, wherein the depressions have an average depth of 15-200 micrometers.

Embodiment 49 is the method of any of embodiments 39-48, wherein the second major surface of the release layer comprises: a second set of microstructured features comprising a plurality of protrusions from the second major surface of the release layer.

Embodiment 50 is the method of embodiment 49, wherein the protrusions have an average height above the second major surface of the release layer of 3-200 micrometers.

Embodiment 51 is the method of embodiment 49, wherein the protrusions have an average height above the second major surface of the release layer of 3-100 micrometers.

Embodiment 52 is the method of embodiment 49, wherein the protrusions have an average height above the second major surface of the release layer of 3-45 micrometers.

Embodiment 53 is the method of any of embodiments 39-52, wherein the ink material fully fills the depressions with which it overlaps.

Embodiment 54 is the method of any of embodiments 39-53, wherein the ink material comprises a non-adhesive but adhesively transferrable material and the ink material overlaps with 0.1-30% of the depressions on the surface of the second major surface of the release layer.

Embodiment 55 is the method of any of embodiments 39-53, wherein the ink material comprises an adhesive material and the ink material overlaps with 5-80% of the depressions on the surface of the second major surface of the release layer.

Embodiment 56 is the method of any of embodiments 39-55, wherein the release liner is a composite release liner further comprising a base layer with a first major surface and a second major surface, wherein the first major surface of the release layer is in contact with the second major surface of the base layer.

EXAMPLES

Printing compositions were prepared and applied to liners. These materials were transferred from the release liners to the adhesive surface of a film article. These examples are merely for illustrative purposes only and are not meant to be limiting on the scope of the appended claims. All parts, percentages, ratios, etc. in the examples and the rest of the specification are by weight, unless noted otherwise. The following abbreviations are used herein: BCM=billion cubic microns; LPI=lines per inch; m/min=meters per minute; mm=millimeters; cm=centimeters; um=micrometers, in=inch, kPa=kilopascal, ft=feet.

Materials:

| Abbreviation | Description |
|---|---|
| PS1 | Cyrel DPR flexographic printing plate from Dupont, Wilmington, DE |
| F1 | Particle filled, Embossed Release Liner as described in U.S. Pat. No. 6,197,397 (Sher et al.) Example 9 with surface depressions of 7225/in$^2$ (1120/cm$^2$) at a density of 85 lines per inch (33 lines per cm), and surface protrusions with 60 degrees draft angle in a square lattice with 390 micrometers spacing and 13-14 micrometers height. |
| SC1 | Red Solvent Based Printing Ink, commercially available from Sun Chemical, Northlake, IL as SUNSPECTRO SB TRUWEATHER YS RED, product number: TLQFS4030290 |
| SC2 | Clear Solvent Based Printing Ink, commercially available from Sun Chemical, Northlake, IL as SUNSPECTRO SB TRUWEATHER NS OPV, product number: TLRFS0710447 |
| ADH1 | An acrylic pressure sensitive adhesive solution (described as Adhesive Solution 1 in U.S. Pat. No. 5,296,277 (Wilson et al.) containing 0.15 parts of bis amide crosslinker and 16 parts of tackifier) prepared at a solids content of 38.5%. The tackifier used was Terpene Phenol, available from Kraton Corporation, Houston, TX as SYLVARES TP2019. |
| ADH2 | Acrylic Adhesive, commercially available from 3M Company, St. Paul J MN as 3M Screen Printable Adhesive SP7555 Transparent |
| PA1 | Hydrophobic Amorphous Fumed Silica, commercially available by Cabot, Billerica, MA, as CAB-O-SIL TS-610 |
| TOB1 | BASF (Ludwigshafen, Germany) TINOPAL OB fluorescent optical brightener |
| PC1 | Printing composition 1 was a mixture of 96.0% by weight SC1 and 4.0% py weight PA1 |
| PC2 | Printing composition 2 was a mixture of 95.9% by weight SC1, 4.0% by weight PA1, and 0.1% by weight TOB1 |
| PC3 | Acrylic Printing Ink, commercially available from Nazdar Company, Shawnee, KS as NAZDAR 7400 Series UV Letterpress Ink: Base Reflex Blue 7418 |
| AR1 | Anilox Roll, 25 BCM/120 LPI manufactured by Apex North America LLC (Donora, PA) |
| AR2 | Anilox Roll, 10 BCM/250 LPI manufactured by Apex North America LLC (Donora, PA) |

Printed Liner and Adhesive Coated Examples

Printing Ink Preparation:

Printing inks PC1 and PC2 were thoroughly mixed via an air-driven impellor mixer until the PA1 additive was well mixed into the printing inks.

Printing Pattern:

The flexographic printing plate PS1 was processed by Southern Graphic Systems (Brooklyn Park, Minn.) to obtain a predetermined print pattern based on PDF image supplied to Southern Graphic Systems. The pattern consisted of text spelling out as "Private Label," where the height and width of the text were approximately 1 in (2.5 cm) and 3 in (7.6 cm), respectively. The overall size of the processed printing plate was approximately 4 in (10.1 cm)×6 in (15.2 cm) in size, trimmed to size to fit the printing roller of a desktop Flexiproof 100 (RK PrintCoat Instruments Ltd, Hertfordshire, UK).

Example Preparation

Example 1

PC1 was printed onto the release side of F1, using a desktop Flexiproof 100 (RK PrintCoat Instruments Ltd, Hertfordshire, UK) and the processed printing plate PS1, at 10 meters per minute using anilox roll AR1, then dried in a batch oven at 93° C. for 2 minutes, to evaporate the solvent contained in PC1 and to solidify a red printed pattern of "Private Label" on F1. Next, the printed side of the resulting liner was overcoated with ADH1 using a notch bar coater (Paul N. Gardner Company, Pompano Beach, Fla.) and dried at 190° C. for 10 minutes, to give a dry thickness of 25 micrometers for the adhesive layer. The exposed adhesive side of the coating was laminated at room temperature and 40 pounds per square inch (276 kPa) to a cast, opaque, white PVC film with a thickness of 51 micrometers with a 0.5-1.0 micrometer thick layer of primer. The printed liner was then removed, and the printed pattern was transferred to the adhesive surface and clearly visible by naked eyes.

Example 2

PC2 was printed onto the release side of F1, using a desktop Flexiproof 100 (RK PrintCoat Instruments Ltd, Hertfordshire, UK) and the processed printing plate PS1, at 10 meters per minute using anilox roll AR1, then dried in a batch oven at 93° C. for 2 minutes, to evaporate the solvent contained in PC2 and to solidify a clear printed pattern of "Private Label" on F1 that was visible by naked eyes with the aid of a black light. Next, the printed side of the resulting liner was overcoated with ADH1 using a notch bar coater (Paul N. Gardner Company, Pompano Beach, Fla.) and dried at 190° C. for 10 minutes, to give a dry thickness of 25 micrometers for the adhesive layer. The exposed adhesive side of the coating was laminated at room temperature and 40 pounds per square inch (276 kPa) to a cast, opaque, white PVC film with a thickness of 51 micrometers with a 0.5-1.0 micrometer thick layer of primer. The printed liner was then removed, and the printed pattern was transferred to the adhesive surface and clearly visible by naked eyes with the aid of a black light.

Example 3

PC3 was printed onto the release side of F1, using a desktop Flexiproof 100 (RK PrintCoat Instruments Ltd, Hertfordshire, UK) and the processed printing plate PS1, at 10 meters per minute using anilox roll AR2, then passed five times through a Fusion UV Lamp equipped with H- and D-bulbs at 10.6 meters per minute until sufficiently cured to the touch, and to solidify a blue printed pattern of "Private Label" on F1. Next, the printed side of the resulting liner was overcoated with ADH1 using a notch bar coater (Paul N. Gardner Company, Pompano Beach, Fla.) and dried at 190° C. for 10 minutes, to give a dry thickness of 25 micrometers for the adhesive layer. The exposed adhesive side of the coating was laminated at room temperature and 40 pounds per square inch (276 kPa) to a cast, opaque, white PVC film with a thickness of 51 micrometers with a 0.5-1.0 micrometer thick layer of primer. The printed liner was then removed, and the printed pattern was transferred to the adhesive surface and clearly visible by naked eyes.

Example 4

PC1 was printed onto the release side of F1, using a desktop Flexiproof 100 (RK PrintCoat Instruments Ltd, Hertfordshire, UK) and the processed printing plate PS1, at 10 meters per minute using anilox roll AR1, then dried in a batch oven at 93° C. for 2 minutes, to evaporate the solvent contained in PC1 and to solidify a red printed pattern of "Private Label" on F1. Next, this printed liner was overcoated with ADH2 using a wire wound rod #16 (RD Specialties, Webster N.Y.), targeting a 40-micrometer wet thickness onto the release side of the pattern printed liner, and was then passed twice through a Fusion UV Lamp equipped with H- and D-bulbs at 35 ft/min (10.7 m/min) until sufficiently cured to the touch. The exposed adhesive side of the coating was laminated at room temperature and 40 pounds per square inch (276 kPa) to a cast, opaque, white PVC film with a thickness of 51 micrometers with a 0.5-1.0 micrometer thick layer of primer. The printed liner was then removed, and the printed pattern was transferred to the adhesive surface and clearly visible by naked eyes.

Example 5

PC1 was printed onto the release side of F1, using a desktop Flexiproof 100 (RK PrintCoat Instruments Ltd, Hertfordshire, UK) and the processed printing plate PS1, at 10 meters per minute using anilox roll AR1, then dried in a batch oven at 93° C. for 2 minutes, to evaporate the solvent contained in PC1 and to solidify a red printed pattern of "Private Label" on F1 to make a printed liner. ADH1 was first coated on a flat release liner using a notch bar coater (Paul N. Gardner Company, Pompano Beach, Fla.) and dried at 190° C. for 10 minutes, to give a dry thickness of 25 micrometers for the adhesive layer. The exposed adhesive side of the coating was laminated at room temperature and 40 pounds per square inch (276 kPa) to a cast, opaque, white PVC film with a thickness of 51 micrometers with a 0.5-1.0 micrometer thick layer of primer. Then the flat release liner was removed to expose the other side of the adhesive layer, which was laminated at room temperature and 40 pounds per square inch (276 kPa) to the release side of the printed liner. Next the printed liner was removed, and the printed pattern was transferred to the adhesive surface of the white opaque vinyl film. Then the adhesive side of the white opaque vinyl film was laminated at room temperature and 40 pounds per square inch (276 kPa) to a white painted flat aluminum panel. The raised feature of the "Private Label" print was clearly visible on the surface of the white opaque vinyl film.

What is claimed is:

1. A release liner comprising:
   a release layer with a first major surface and second major surface, wherein the second major surface of the release layer comprises:
      a first set of microstructured features comprising a plurality of depressions into the second major surface of the release layer, wherein the plurality of depressions comprises 1-50% of the area of the second major surface; and
      a discontinuous non-random pattern of ink material located on the second major surface of the release layer, wherein at least a portion of the discontinuous pattern of ink material overlaps with and is located within some, but not all of the depressions, wherein the ink material comprises a non-adhesive but adhesively transferrable material, or an adhesive material.

2. The release liner of claim 1, wherein the ink material comprises a polymeric material or a pre-polymeric material that upon polymerization forms a polymeric material, and one or more detectable additives selected from a colorant, a pigment, an optical brightener, or particles.

3. The release liner of claim 1, wherein the ink material has been printed onto the second major surface of the release layer.

4. The release liner of claim 1, wherein the plurality of depressions further comprise particles or clumps of particles contained within the depressions.

5. The release liner of claim 1, wherein the depressions have an average depth of 15-200 micrometers.

6. The release liner of claim 1, wherein the second major surface of the release layer comprises:
   a second set of microstructured features comprising a plurality of protrusions from the second major surface of the release layer.

7. The release liner of claim 6, wherein the protrusions have an average height above the second major surface of the release layer of 3-200 micrometers.

8. The release liner of claim 1, wherein the ink material fully fills the depressions with which it overlaps.

9. The release liner of claim 1, wherein the ink material comprises a non-adhesive but adhesively transferrable material and the ink material overlaps with 0.1-30% of the depressions on the surface of the second major surface of the release layer.

10. The release liner of claim 1, wherein the ink material comprises an adhesive material and the ink material overlaps with 5-80% of the depressions on the surface of the second major surface of the release layer.

11. The release liner of claim 1, wherein the release liner is a composite release liner wherein the release liner further comprises a base layer with a first major surface and a second major surface, wherein the first major surface of the release layer is in contact with the second major surface of the base layer.

* * * * *